(12) United States Patent  (10) Patent No.: US 8,272,231 B2
Dong  (45) Date of Patent: Sep. 25, 2012

(54) DIRECT EXPANSION EVAPORATOR

(76) Inventor: Lingyu Dong, Zhejiang (CN)

( * ) Notice: Subject to any disclaimer, the term of this patent is extended or adjusted under 35 U.S.C. 154(b) by 548 days.

(21) Appl. No.: 12/462,107

(22) Filed: Jul. 28, 2009

(65) Prior Publication Data

US 2011/0023519 A1    Feb. 3, 2011

(51) Int. Cl.
 *A23G 9/00*  (2006.01)
(52) U.S. Cl. .......................... 62/342; 62/389
(58) Field of Classification Search .................. 62/342, 62/340, 525, 384, 390, 389; 222/129, 146.6; 165/154, 184
See application file for complete search history.

(56) References Cited

U.S. PATENT DOCUMENTS

| | | | | |
|---|---|---|---|---|
| 2,418,994 A * | 4/1947 | Taylor | .............. | 62/394 |
| 4,148,334 A * | 4/1979 | Richards | .............. | 137/389 |
| 4,287,724 A * | 9/1981 | Clark | .............. | 62/272 |
| 4,597,525 A * | 7/1986 | Cushman et al. | .............. | 239/28 |
| 4,781,309 A * | 11/1988 | Vogel | .............. | 222/129.1 |
| 4,986,994 A * | 1/1991 | Baccus, Jr. | .............. | 426/330.3 |
| 5,048,724 A * | 9/1991 | Thomas | .............. | 222/95 |
| 5,361,941 A * | 11/1994 | Parekh et al. | .............. | 222/95 |
| 5,363,671 A * | 11/1994 | Forsythe et al. | .............. | 62/197 |
| 5,428,963 A * | 7/1995 | Korycki et al. | .............. | 62/93 |
| 5,463,878 A * | 11/1995 | Parekh et al. | .............. | 62/394 |
| 5,664,436 A * | 9/1997 | Hawkins et al. | .............. | 62/390 |
| 6,158,235 A * | 12/2000 | Hawkins et al. | .............. | 62/399 |
| 6,301,918 B1 * | 10/2001 | Quartarone et al. | .............. | 62/342 |
| 6,604,654 B2 * | 8/2003 | Staten et al. | .............. | 222/1 |
| 6,622,510 B2 * | 9/2003 | Giroux et al. | .............. | 62/342 |
| 6,662,573 B2 * | 12/2003 | Hawkins et al. | .............. | 62/59 |
| 6,981,387 B1 * | 1/2006 | Morgan | .............. | 62/390 |
| 2002/0083730 A1 * | 7/2002 | Giroux et al. | .............. | 62/354 |
| 2003/0080644 A1 * | 5/2003 | Nelson et al. | .............. | 310/196 |

* cited by examiner

*Primary Examiner* — Mohammad Ali
(74) *Attorney, Agent, or Firm* — Raymond Y. Chan; David and Raymond Patent Firm

(57) ABSTRACT

A direct expansion evaporator for making a frozen product from raw material includes a feeding channel, a heat exchange channel thermally communicating with the feeding channel, and a refrigerant flowing within the heat exchange channel for exchanging heat between the raw material within the feeding channel and the refrigerant within the heat exchange channel in an expanded evaporation manner. Therefore, the refrigerant releases the thermal energy via the phase changing from liquid to gaseous state of the refrigerant. The heat exchange channel has a pre-cooling portion for pre-cooling the raw material at a predetermined temperature and a freezing portion for freezing the raw material to a final predetermined temperature of the frozen product in two-stage evaporation manner. Thus, the direction expansion evaporator provides a relatively more efficient way for making the frozen product, so as to increase the quality of the frozen product.

7 Claims, 3 Drawing Sheets

DIRECT EXPANSION EVAPORATOR

BACKGROUND OF THE PRESENT INVENTION

1. Field of Invention

The present invention generally relates to a heat exchange apparatus, and more particularly to a direct expansion evaporator for a refrigeration system, wherein the direct expansion evaporator provides two heat-exchange stages for making a frozen product from raw material while being energy efficient.

2. Description of Related Arts

A direct expansion evaporator for heat exchanging, such as a heat exchanger, is commonly and widely applied in lots of areas, such as industrial or medical application. For example, the heat exchanger is used in a chemical factory for cooling down a waste to prevent overheating the waste. Heat exchange is also applied in refrigeration, freezer system, or air conditioner for exchanging the heat from the air or the frozen product to keep it under certain temperature.

Most of the heat exchange used for cooling system applies a refrigerant to provide a lower temperature source, which has the temperature below to the targeted object for being cooled, so that the heat exchanging is driven by the driving temperature between the refrigerant and the object to achieve the cooling purpose.

Traditionally, the refrigerant is stored in a high pressure container and released via an expansion valve to a heat exchange chamber, which has lower pressure than the high pressure container, so that the refrigerant is rapidly evaporated to gaseous phase due to the pressure drop, so as to provide the thermal energy to the heat exchange chamber. The phase change from liquid to gas of the refrigerant absorbs dramatic heat energy, so that the targeted object is able to be cooled in a short period. Therefore, the heat exchanger plays an important role of using the refrigerant for a cooling system, such as for making a frozen product.

In other words, evaporator is a critical heat-exchanging component in the refrigeration system. It is a decisive factor of the system capacity and efficiency. When liquid refrigerant enters the evaporator through the expansion valve or a capillary tube, it rapidly vaporizes due to the sudden expansion of volume and reduction of pressure. During this vaporization process, the refrigerant absorbs heat from the cooling medium through the evaporator wall or housing with good thermal conductivity.

There are several types of evaporator commonly used for cooling system in the existing market: coil type, fin type, and spiral channel type. The coil type evaporator has a copper tube filling with refrigerant and a feeding tube for containing raw material therein. The copper tube is adapted at a position that the copper tube is winding at the outer surface of the feeding tube, so that the thermal energy is transferred through the walls of copper tube and feeding tube for heat exchanging. Therefore, the heat exchange takes place through not only the wall of the feeding tube but also the wall of the copper tube.

However, the contacting area between the copper tube and the feeding tube is limited. The heat is conductively transferred through two layers, the walls of copper tube and feeding tube, so that the heat transferring is inefficient.

The fin type heat exchanger has a plurality of fins welded on the refrigeration cylinder to provide alternatively channels for the flow of the refrigerant from the inlet to the outlet so as to prolong the traveling distance and time of the refrigerant. Although it has higher heat transfer rate to perform a relatively more efficient heat exchanging, it is complicated in fabrication procedure. Thus, it also results in high manufacturing cost and low productivity.

In order to increase the efficiency of heat exchanger, the spiral type heat exchanger is also provided for enhancing the heat transferring rate. The spiral type has threads on the inner surface of outer cylinder enclosing the feeding pipe therein, so that the refrigerant is flowing in the spiral threads channel between the feeding pipe and the outer cylinder. Though it enhances the heat exchanging efficiency, the spiral threads outer cylinder is relatively longer and needs precise assembly process. Thus, it is high in manufacturing cost and not suitable for batch process or mass production.

Therefore, using the direct expansion evaporator or heat exchanger to exchange heat for making a frozen product needs a relatively more efficient expansion evaporator or heat exchanger. Take ice cream as the frozen product for example. The ice cream raw material made in the traditional spiral type can not efficiently provide the thermal energy that needed for freezing the ice cream to a desired hardness. The spiral type does not have enough expansion area in the heat exchange channel for release the thermal energy in the expanded evaporation manner. Thus, the spiral type of direct expansion evaporator uses relatively more power and is not efficient for using in batch process for producing a massive amount of frozen product.

For another example, frozen yogurt needs more thermal energy to form the final frozen product, otherwise, it usually tempts to be too soggy or liquefied to become the frozen yogurt. The existing heat exchangers of direct expansion evaporator can not provide an efficient and capable of producing a relatively larger amount of frozen products. Therefore, it is an attempt of the present invention to provide a more efficient direction expansion evaporator, so as to prevent the energy waste and make better quality of frozen product.

SUMMARY OF THE PRESENT INVENTION

An object of the present invention is to provide a direct expansion evaporator, which is able to be relatively more efficient for the heat exchanging process of making frozen product from raw material.

Another object of the present invention is to provide a direct expansion evaporator, which provides two heat-exchange states for making a frozen product from raw material while being energy efficient.

Another object of the present invention is to provide a direct expansion evaporator, wherein the two heat-exchange stages are a pre-cooling stage for initially pre-cooling the raw material at the entrance and a freezing stage for conclusively making the frozen product before the exit, so as to efficiently transferring thermal energy to make the frozen product.

Another object of the present invention is to provide a direct expansion evaporator, which is able to completely evaporate a refrigerant from liquid to gaseous phase, so as to prevent the back flow of the liquid refrigerant.

Another object of the present invention is to provide a direct expansion evaporator, wherein the heat exchange channel has a pre-cooling portion and a freezing portion extending therefrom to provide the pre-cooling stage and the freezing stage respectively.

Another object of the present invention is to provide a direct expansion evaporator, wherein the refrigerant initially enters into the heat exchange channel at the dispensing end of the feeding channel and exits the heat exchange channel at the feeding end of the feeding channel. Therefore, when the refrigerant initially enters into the heat exchange channel, the refrigerant provides sufficient heat absorbing power at the freezing portion of the heat exchange channel. When the refrigerant passes through the pre-cooling portion of the heat exchange channel, the refrigerant will gradually vaporize to the gaseous phase for pre-cooling the raw material.

Another object of the present invention is to provide a direct expansion evaporator, wherein the traveling time of the refrigerant is prolonged at the pre-cooling stage to ensure the liquid refrigerant being completely evaporated.

Another object of the present invention is to provide a direct expansion evaporator, which is relatively simple in structure and high efficient in converting chemical energy to thermal energy for heat exchanging process of making frozen product, so as to minimize the manufacturing cost of the direct expansion evaporator of the present invention for incorporating with the refrigeration system.

Accordingly, in order to accomplish the above objects, a direct expansion evaporator of the present invention comprises:

a feeding channel having a feeding end and a dispensing end for the raw material feeding through the feeding channel;

a heat exchange channel thermally communicating with the feeding channel, wherein the heat exchange channel has a pre-cooling portion defining from the feeding end of the feeding channel and a freezing portion to the dispensing end to thermally communicate with the feeding channel in a two-stage evaporation manner; and a refrigerant passing through the heat exchange channel for heat exchanging with the raw material within the feeding channel, wherein when the refrigerant flows at the pre-cooling portion of the heat exchange channel, the raw material fed from the feeding end of the feeding channel is initially pre-cooled at a pre-cooling temperature, and when the refrigerant flows at the freezing portion of the heat exchange channel, the raw material is then substantially frozen to form the frozen product before the frozen product is dispensed at the dispensing end of the feeding channel while being energy efficient.

These and other objectives, features, and advantages of the present invention will become apparent from the following detailed description, the accompanying drawings, and the appended claims.

DETAILED DESCRIPTION OF THE PREFERRED EMBODIMENT

Figure 1:
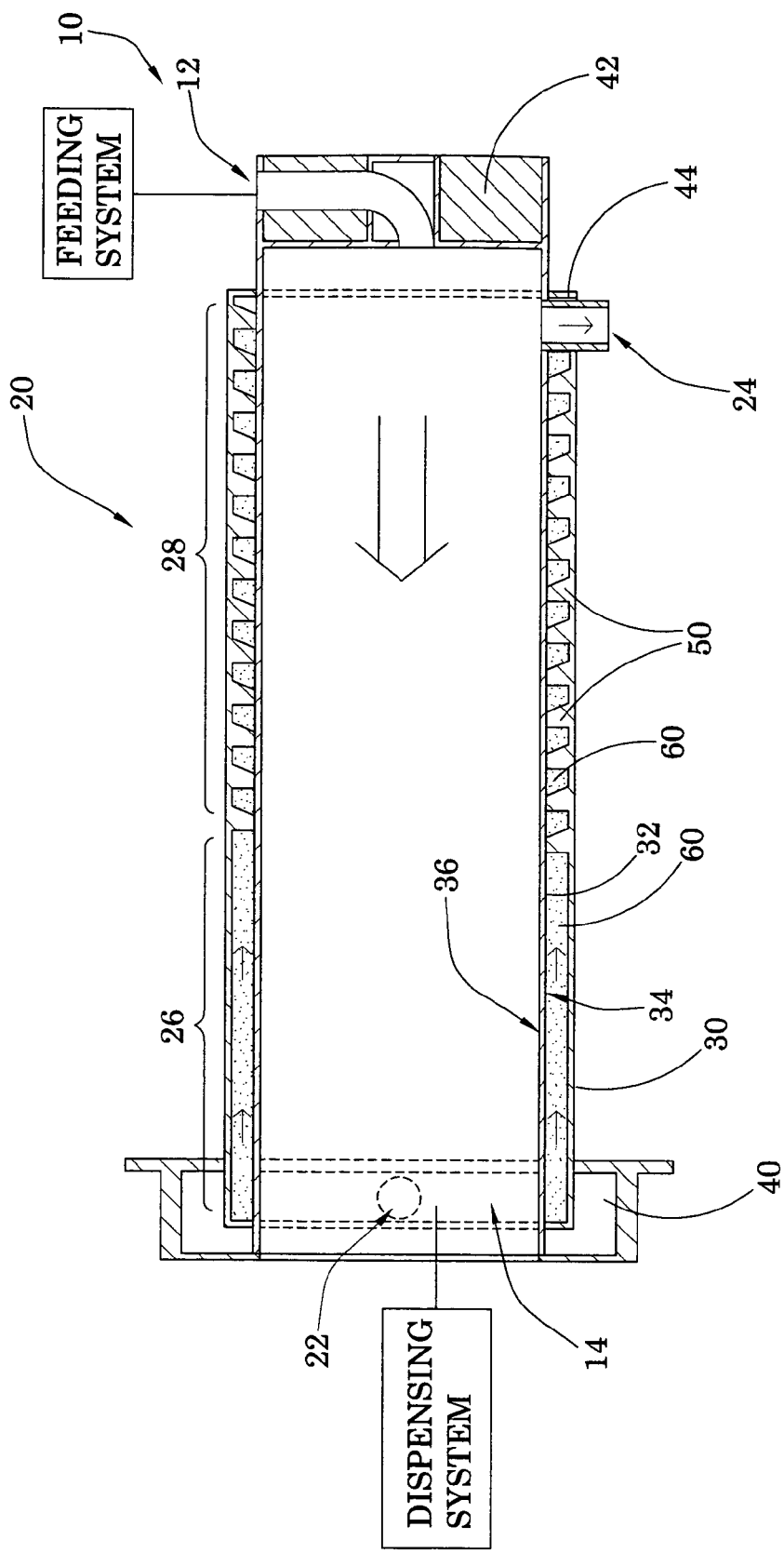
FIG. 1 is a sectional view of a direct expansion evaporator according to a preferred embodiment of the present invention.
Figure 2:
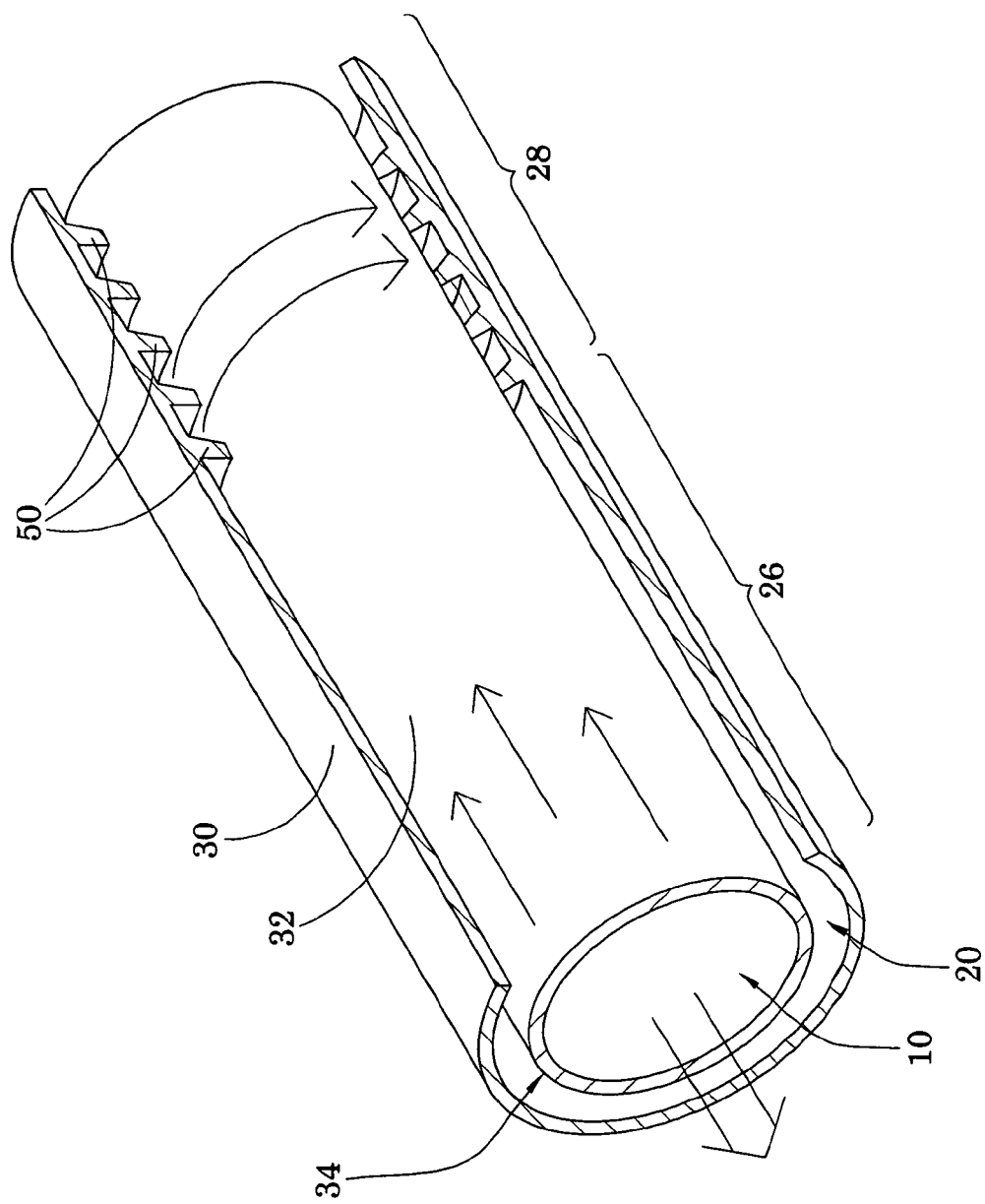
FIG. 2 is a partially perspective view of the direct expansion evaporator according to the preferred embodiment of the present invention, illustrating the relationship between the feeding direction of the raw material and the flow direction of the refrigerant.

Referring to FIGS. 1 and 2 of the drawings, a direct expansion evaporator according to a preferred embodiment of the present invention is illustrated, wherein the direct expansion evaporator is adapted for heat-exchanging with a heat source. According to the preferred embodiment, the direct expansion evaporator is incorporated with a refrigeration system for making a frozen product from a raw material. For example, a heat exchanger of the direct expansion evaporator is provided to supply a thermal energy for exchanging heat between a refrigerant 60 and the raw material, so as to make the frozen product.

The direct expansion evaporator comprises a feeding channel 10 and a heat exchange channel 20 thermally communicating with the feeding channel 10 for heat exchanging.

The feeding channel 10 has a feeding end 12 and an opposite dispensing end 14 for the raw material feeding through the feeding channel 10 from the feeding end 12 to the dispensing end 14.

The heat exchange channel 20 has an inlet 22 and an outlet 24 preferably for the refrigerant 60 flowing through the heat exchange channel 20, wherein the feeding channel 10 is coaxially aligned with the heat exchange channel 20. Accordingly, the refrigerant 60 is guided to pass through the heat exchange channel 20 from the inlet 22 to the outlet 24 for heat exchanging with the raw material within the feeding channel 10. In other words, the raw material is guided to enter into the feeding end 12 of the feeding channel 10 while the frozen product is guided to exit the dispensing end 14 of the feeding channel 10.

The inlet 22 of the heat exchange channel 20 is preferably located adjacent to the dispensing end 14 of the feeding channel 10, while the outlet 24 of the heat exchange channel 20 is located adjacent to the feeding end 12 of the feeding channel 10, so that the heat exchanging rate is minimized. Therefore, a flow direction of the refrigerant flowing from the inlet 22 to the outlet 24 of the heat exchange channel 20 is concurrent and opposite to a feeding direction of raw material feeding from the feeding end 12 to the dispensing end 14 of the feeding channel 10, so as to efficiently freezing the raw material to the frozen product.

It is appreciated that the flowing direction of the refrigerant and the feeding direction of the raw material may be in the same direction depending on the design and purpose of the direct expansion evaporator. However, the opposite direction between the refrigerant 60 and the raw material as the preferred embodiment will enhance the energy efficiency of the heat exchange process.

In the preferred embodiment of the present invention, the thermal energy, which is needed for making the frozen product, is preferably through the phase change between a liquid phase and a gaseous of the refrigerant 60. The refrigerant 60 is preferably in liquid phase under a predetermined high pressure before entering into the heat exchange channel 20 through the inlet 22. The liquid phase refrigerant 60 is rapidly converting into gaseous phase after the refrigerant 60 entering the heat exchange channel 20 due to an expansion of area within the heat exchange channel 20 and a pressure drop to decrease the boiling point of the refrigerant 60, so that a negative thermal energy is released via the absorption of the phase change of the refrigerant 60 from liquid to gaseous state. Thus, the refrigerant 60 is able to be evaporated to gaseous phase in an expansion manner, so as to prevent a back flow of the liquid refrigerant 60 and enhance the cooling capacity.

In other words, the liquid refrigerant 60 is in gaseous phase exiting the heat exchange channel 20 through the outlet 24, such that the thermal energy can be totally release from the phase change of liquid refrigerant 60 to gaseous state. For example, the refrigerant 60 may be stored in a high pressure container in liquid state. The liquid refrigerant 60 may be entered into the heat exchange channel 20 in a pressurized manner, so that the liquid refrigerant 60 is rapidly evaporated in the relatively lower pressure and larger space of heat exchange channel 20. The conversion of the liquid phase to gaseous phase is an absorption reaction, so that the refrigerant 60 absorbs a significant amount of heat from the raw material in the feeding channel 10, so as to release negative thermal energy for making the frozen product.

Accordingly, the heat exchange channel 20 has a pre-cooling portion 28 defining from the feeding end 12 of the feeding channel 10 and a freezing portion 26 thermally communicating with the feeding channel 10 for making the raw material to the frozen product in a two-stage evaporation manner. The freezing portion 26 of the heat exchange channel 20 is preferably located adjacent to the dispending end 14 of the feeding channel 10, and the pre-cooling portion 28 of the heat exchange channel 20 is preferably located adjacent to the feeding end 12 of the feeding channel 10, such that the raw material is able to be frozen in the two-stage manner, so as to enhance the efficiency for making the frozen product via the direct expansion evaporator.

In the pre-cooling stage, the raw material is initially pre-cooled at a predetermined pre-cooled temperature when the raw material is fed into the feeding end 12 of the feeding channel 10 in responsive to the pre-cooling portion 26 of the heat exchange channel 20. In the freezing stage, the pre-cooled raw material is further being frozen at a predetermined frozen temperature to form the frozen product from the raw material within the feeding channel 10 in responsive to the freezing portion 26 of the heat exchange channel 20, in such a manner that the frozen product is able to be efficiently reducing the temperature in the freezing stage.

Therefore, the flowing direction of the refrigerant 60 at the freezing portion 26 of the heat exchange channel 20 is preferably parallel to the feeding direction of the raw material at the feeding channel 10, while the flowing direction of the refrigerant 60 at the pre-cooling portion 28 of the heat exchange channel 20 is tangent to the feeding direction of the raw material at the feeding channel 10, so as to prolong the traveling time and distance in the pre-cooling portion 28 of the heat exchange channel 20.

In the preferred embodiment of the present invention, the direct expansion evaporator preferably comprises an outer guiding duct 30 and an inner guiding duct 32 coaxially surrounded by the outer guiding duct 30 to define the heat exchange channel 20 between the outer guiding duct 30 and the inner guiding duct 32. The feeding channel 10, thus, is defined within the inner guiding duct 32. In other words, the heat exchange channel 20 is formed between an inner wall of the outer guiding duct 30 and an outer wall of the inner guiding duct 32. The feeding channel 10 is formed within the inner wall of the inner guiding duct 32. Therefore, the refrigerant 60 flowing within the heat exchange channel 20 is thermally and conductively communicating with raw material through an outer surface 34 of the inner guiding duct 32 to an inner surface 36 of the inner guiding duct 32. Preferably, the feeding channel 10 is made by a material having a relatively high thermal conductive coefficient for efficiently and conductively transferring thermal energy between the raw material and the refrigerant 60.

As shown in FIG. 1, the inlet 22 of the heat exchange channel 20 is radially formed at an end of the outer guiding channel 30 at a position close to the dispensing end 14 of the feeding channel 10. The outlet 24 of the heat exchange channel 20 is radially formed at an opposed end of the outer guiding channel 30 at a position close to the feeding end 12 of the feeding channel 10.

As will be appreciated, the heat exchange channel 20 and the feeding channel 10 may be formed in variety of shapes for the refrigerant 60 and raw material passing therewithin respectively. The heat exchange channel 20 may thermally communicate with the feeding channel 10 for heat exchanging with the raw material in a plurality of configurations to achieve the heat transport between one medium, embodied as refrigerant, to another medium, embodied as raw material for making frozen product.

More specifically, the outer guiding duct 30 and inner guiding duct 32 may have tubular shape, wherein the outer guiding duct 30 is preferably coaxially enclosing the inner guiding duct 32 to form the heat exchange channel 20 therebetween, so that the refrigerant 60 is surrounding the feeding channel 10 for thermally communicating with the raw material at the feeding channel 10. It is worth to mention that the coaxially tubular configuration of the heat exchange channel 20 and feeding channel 10 provides a relatively larger heat exchange area, so as to enhance the ability for freezing the raw material to the frozen product having the desired low temperature.

As shown in FIG. 1, a front panel 40 and a rear cover 42 may further provided for air-sealing the heat exchange channel 20 and the feeding channel 10, wherein the front cover 40 is provided at a position adjacent to the dispensing end 14 of the feeding channel 10 and the inlet 22 of the heat exchange channel 20, while the rear cover 42 is provided at a position adjacent to the feeding end 12 of the feeding channel 10 and the outlet 24 of the heat exchange channel 20, so that the refrigerant 60 and raw material within the heat exchange channel 20 and feeding channel 10 respectively are air-sealed therewithin, so as to prevent the waste of thermal energy and the leakage of the refrigerant 60 through the heat exchange channel 20.

In the preferred embodiment of the present invention, at least a sealing ring 44 may further provided at the outer guiding duct 30 at a position between the feeding end 12 of the feeding channel 10 and the outlet 24 of the heat exchange channel 20 in an air-sealed manner, so as to prevent the waste of thermal energy within the heat exchange channel 20 and the feeding channel 10.

The front and rear cover 40, 42 may be made by heat insulated material for providing sufficiently heat insulation protection, so as to ensure the thermal energy generated from the refrigerant is able to substantially transfer to the raw material, so as to increase the energy efficient.

Accordingly, in order to form the pre-cooling portion 28 for pre-cooling the raw material to a predetermined pre-cooled temperature, a guiding wall 50 is preferably extended between the outer guiding duct 30 and the inner guiding duct 32 at the pre-cooling portion 28 in a spiral manner. The freezing portion 26 of the heat exchange channel 20 is embodied as a cylindrical shape between the outer guiding duct 30 and the inner guiding duct 32. Therefore, the guiding wall 50 formed a helix shaped channel at the pre-cooling portion 28 of the heat exchange channel 20, so that a traveling time of refrigerant at the pre-cooling portion 28 is prolonged via prolonging the traveling distance by the guiding wall 50 extended in spiral manner.

Therefore, the freezing portion 26 of the heat exchange channel 20 has a cylindrical shape formed between the outer guiding duct 30 and the inner guiding duct 32, so that it is able to maximize an expansion area of the refrigerant 60 when the liquid refrigerant 60 entering the inlet 22 of the heat exchange channel 20. In other words, when the refrigerant 60 initially enters into the inlet 22 of the heat exchange channel 20, the refrigerant 60 has sufficient heat absorbing power at the freezing portion 26 of the heat exchange channel 20 to freeze the raw material to form the frozen product before the frozen product exits at the dispensing end 14 of the feeding channel 10.

The guiding wall 50, which is extended in spiral manner between the outer and inner guiding duct 30, 32 at the pre-cooling portion 28, forms the helix shaped channel thereat, so that the traveling distance for the refrigerant 60 passing through at the pre-cooling portion 28 is prolonged, so as to prolong the traveling time for the refrigerant 60 being completely evaporated. In other words, when the refrigerant 60 passes along the heat exchange channel 20 from the freezing portion 26 to the pre-cooling portion 24, the heat absorbing power of the refrigerant 60 is gradually reducing. Therefore, the refrigerant 60 at the pre-cooling portion 24 of the heat exchange channel 20 can pre-cool the raw material at the feeding channel 10 when the raw material enters into the feeding channel 10. Throughout the phase change of the refrigerant 60, the refrigerant 60 can initially freeze the raw material at the freezing portion 26 of the heat exchange channel 20 and pre-cool the raw material at the pre-cooling portion 28 of the heat exchange channel 20 while being energy efficient.

It is worth mentioning that the length-ratio of the pre-cooling portion 28 and the freezing portion 26 of the heat exchange channel 20 can be selectively adjusted by the length of the guiding wall 50. Therefore, the total traveling time of the refrigerant 60 along the heat exchange channel 20 can also be selectively adjusted by the physical properties of the refrigerant 60 in responsive to the phase change thereof.

It is appreciated that the helix shaped guiding wall 50 forms a plurality of pitches along an axis of the heat exchange channel 20, which may be uniformly distributed throughout the heat exchange channel 20 at the pre-cooling portion 28 along a helix axis, so as to simply manufacture the helix shaped guiding wall 50.

On skilled in the art will understand that there are a variety ways for prolonging the traveling distance or traveling time of the refrigerant 60 to enable the refrigerant 60 completely evaporated to gaseous phase, so as to prevent the back flow of the liquid refrigerant to significantly reduce the efficiency of the direct expansion evaporator. For example, a plurality of fins may alternatively extend between the outer and inner guiding ducts 30, 32 at the pre-cooling portion 28, so that the traveling distance of the refrigerant 60 is prolonged to ensure completing the phase change of the refrigerant 60.

In the preferred embodiment, the raw material is entered from the feeding end 12 to thermally communicate with the pre-cooling portion 28 of the heat exchange channel 20, so that the raw material is substantially cooled to the predetermined frozen temperature to form the frozen product. The pre-cooled frozen product is further feeding to the dispensing end 14 of feeding channel 10 to thermally communicate with the freezing portion 26 of the heat exchange channel 20 to finish the frozen product.

It is worth to mention that the refrigerant 60, preferably entering at the freezing portion 26 having larger expansion area than the pre-cooling portion 28 through the inlet 22 of the heat exchange channel 20, releases a relatively larger thermal energy, which is negative thermal energy to absorb the heat from the ram material in the feeding channel 10, so that the pre-cooled frozen product in the feeding channel 10 is ensured to be frozen to the predetermined frozen temperature to become the final frozen product, so as to keep the final frozen product dispensed from the dispensing end 14 at a desired frozen temperature. Thus, the frozen product is able to be kept in the predetermined low temperature, so as to ensure the quality of the frozen product.

As mentioned above, the guiding wall 50 in the preferred embodiment may further has a trapezoidal shape having a width gradually reducing from an inner surface of the outer guiding duct 30 to the outer surface 34 of the inner guiding duct 32, in such a manner that the heat exchanging area at the pre-cooling portion 28 between the refrigerant 60 and the raw material is minimized, while the wider width side of the trapezoidal shaped cross section of guiding wall 50 is secured at the inner surface of the outer guiding duct 30 to enhance the structural integrity of the spiral shaped guiding wall 50.

Figure 3:
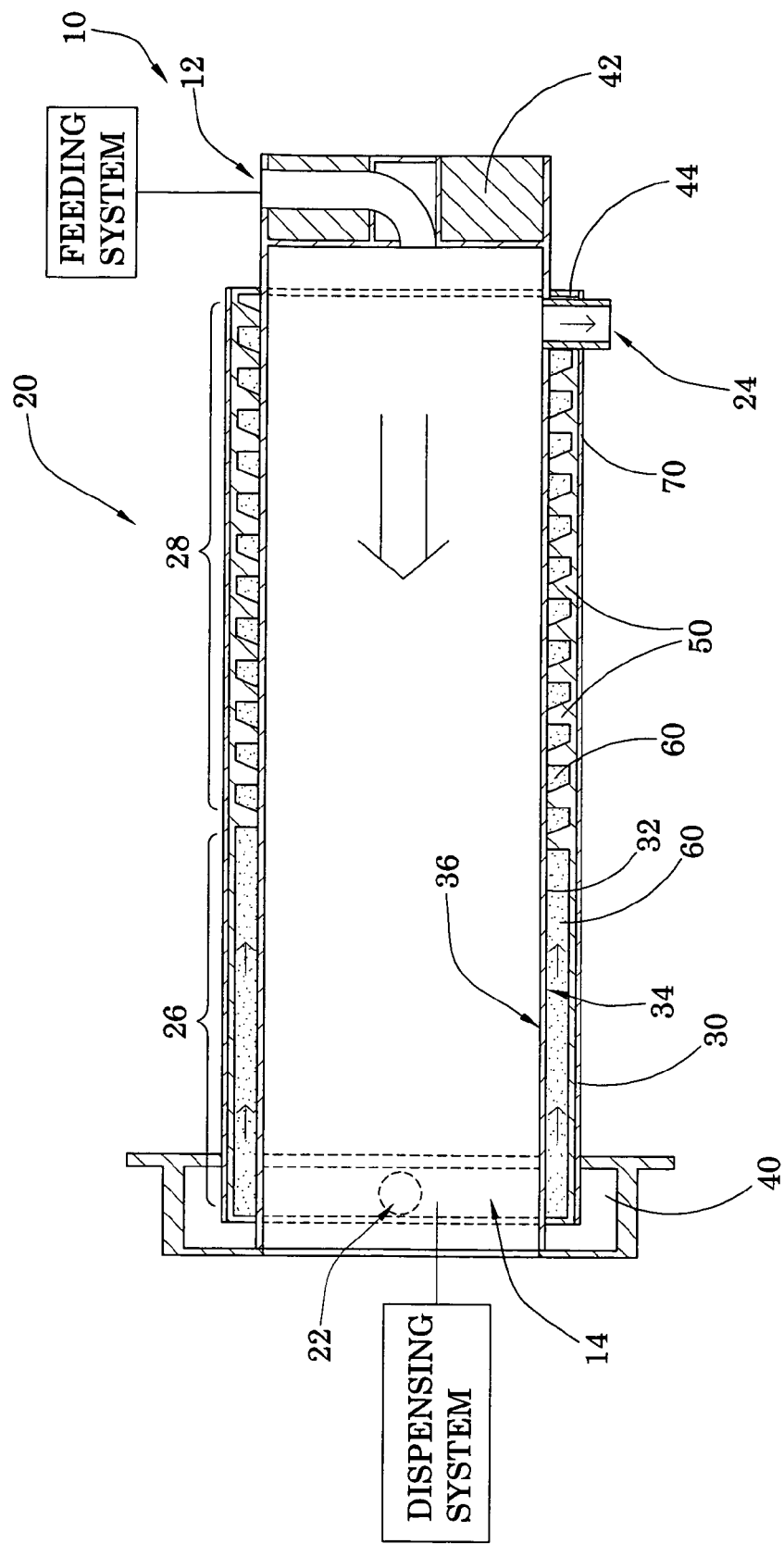
FIG. 3 illustrates an alternative mode of the expansion evaporator according to the preferred embodiment of the present invention, illustrating the insulation layer enclosing the heat exchange channel and the feeding channel.

In order to ensure the heat exchanging substantially occurs only between the refrigerant 60 and the raw material, an insulation layer 70 may further provided to enclose the heat exchange channel 20 and the feeding channel 10 to prevent the thermal energy being conductively or convectively transferred to atmospheres, as shown in FIG. 3. In other words, the insulation layer 70, preferably made by a material having low conductive coefficient, may provided to cover the outer guiding duct 30 to enclose the heat exchange channel 20 and feeding channel 10 in this preferred embodiment of the present invention. The insulation layer 70 is made of insulating material such as polyurethane foam encircling with the outer guiding duct 30 to ensure the refrigerant 60 being heat changed with said raw material through the inner guiding duct 32.

Accordingly, a dispensing system and a feeding system may further incorporate with the direct expansion evaporator, so that the raw material may be prepared for feeding into the feeding channel 10 via the feeding system communicatively connected to the feeding channel 10. The dispensing system may be provided at a position adjacent to the dispensing end 14 of the feeding channel 10, so that the finished frozen product is able to be delivered from the dispensing end 14 through the dispensing system. For example, the dispensing system may include a dispensing valve for being moved between a closed position to air-seal the feeding channel 10 and a dispensing position for outputting the finished frozen product.

In the preferred embodiment of the present invention, a longitudinal propeller (not shown in the figures) of the feeding system may be further coaxially provided within the feeding channel 10 for delivering and blending the raw material from the feeding end 12 to the dispensing end 14 of the feeding channel 10 in a spirally delivering manner. The raw material, such as raw material for making ice cream of frozen product, may be prepared to be feed into the feeding channel 10 from the feeding end 12 via the longitudinal propeller, while being well mixed through the longitudinal propeller.

As described above of the propeller for delivering and mixing the raw material at the feeding channel 10, one skilled in the art will understand that there is variety of lo ways for delivering and/or mixing the raw material within the feeding channel 10 for making the raw material to frozen product. The raw material may also be incorporated with other configurations or types of feeding system for delivering and/or mixing the raw material at the feeding channel 10.

Accordingly, the direct expansion evaporator may be incorporated with a compressor for recycling the evaporated refrigerant 60 and compressing or condensing the gaseous refrigerant 60 back to the liquid phase, so as to accomplish a heat exchange cycle. The liquefied refrigerant 60 from the compressor may be pumped into a high pressure container for keeping and storing the liquid refrigerant 60 for further expansion evaporating use, so as to be prepared to be entered to the expansion area at the freezing portion 26 of the heat exchange channel 20 for being evaporated to release the negative thermal energy. It will be appreciated that the high pressure liquid refrigerant 60 can be stored in variety ways for entering the heat exchange channel 20 in the expansion manner. The high pressure container is one of the examples for simply transportation and storage of the refrigerant 60.

The freezing portion 26 and pre-cooling portion 28 of the heat exchange channel 20 provides two-stage cooling process for making the frozen product and sufficiently increases the heat exchange rate for cooling system of making frozen product, and is more energy efficient. The cylindrical shaped freezing portion 26 of the heat exchange channel 20 provides a relatively larger expansion area for the liquid refrigerant 60 evaporated to provide the thermal energy for fully cooling the frozen product to desired temperature at the dispensing end 14 of the feeding channel 10, so as to ensure the quality of the frozen product. The pre-cooling portion 28 of the heat exchange channel 20 allows the refrigerant 60 fully evaporated to fully convert the phase change energy to thermal energy, so as to prevent the liquid refrigerant 60 back flowing to the heat exchange cycle to reduce the efficiency of the direct expansion evaporator.

Accordingly, the present invention allows the refrigerant 60 to evaporate in two stages, so as to provide the following advantages.

1. The refrigerant 60 evaporates in an enlarged space compared with the traditional evaporators, which maximizes the heat exchange area, minimizes energy loss, and allows the refrigerant 60 to fully evaporate. Therefore, the cooling efficiency and speed of the refrigerant 60 for the raw material are significantly enhanced.

2. The refrigerant 60 is utilized to its fully capacity. The freezing portion 26 of the heat exchange channel 20 for the first stage evaporation is located around the dispensing end 14 of the feeding channel 10 for dispensing the frozen product therefrom. When the liquid refrigerant 60 enters the heat exchange channel 20 through the expansion valve or the capillary tube, the refrigerant 60 absorbs the majority of heat from the raw material. Then, when the refrigerant 60 enters the pre-cooling portion 28 of the heat exchange channel 20 for its second stage evaporation, the refrigerant 60 will keep continuing to absorb heat from the raw material at the feeding channel 10. This configuration allows the raw material entering the feeding end 12 of the feeding channel 10 to be pre-cooled at the second stage evaporation of the refrigerant 60. As the raw material moves towards the dispensing end 14 of the feeding channel 10, the raw material is cooled down rapidly by the violent first stage evaporation of the refrigerant 60 and forms the frozen product.

3. The helix shaped channel of the heat exchange channel 20 at the pre-cooling portion 28 thereof provides sufficient traveling distance and time for the complete phase change of the refrigerant 60 from liquid to vapor. The full evaporation of the refrigerant 60 prevents liquid back flow to the compressor and enhances the system cooling capacity.

4. With the significant reduction of the length of the helix shaped channel of the heat exchange channel 20 compared with the traditional spiral channel type evaporator, the direct expansion evaporator is easier to be manufactured. Hence, the cost of the direct expansion evaporator is significantly lower and is more suitable for mass production.

Therefore, in the preferred embodiment of the present invention, the direct expansion evaporator not only can be used for producing a normal ice cream of the frozen product, but also for efficiently producing a frozen yogurt, which may need relatively more thermal energy for freezing the raw material to the frozen yogurt.

One skilled in the art will understand that the embodiment of the present invention as shown in the drawings and described above is exemplary only and not intended to be limiting.

It will thus be seen that the objects of the present invention have been fully and effectively accomplished. The embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A direct expansion evaporator for making frozen product from raw material, comprising:

a feeding channel having a feeding end and a dispensing end for said raw material feeding through said feeding channel;

a heat exchange channel thermally communicating with said feeding channel, wherein said heat exchange channel has a pre-cooling portion defining from said feeding end of said feeding channel and a freezing portion to said dispensing end to thermally communicate with said feeding channel in a two-stage evaporation manner; wherein said heat exchange channel is guided for refrigerant passing therethrough in order to heat exchange with said raw material within said feeding channel, wherein when said refrigerant flows at said pre-cooling portion of said heat exchange channel, said raw material fed from said feeding end of said feeding channel is initially pre-cooled at a pre-cooling temperature, and when said refrigerant flows at said freezing portion of said heat exchange channel, said raw material is then substantially frozen to form said frozen product before said frozen product is dispensed at said dispensing end of said feeding channel while being energy efficient;

an outer guiding duct and an inner guiding duct coaxially enclosed within said outer guiding duct to define said feeding channel within said inner guiding duct and said heat exchange channel between said outer and inner guiding ducts in an air-sealed manner, wherein when said raw material is fed along said inner guiding duct, said refrigerant is thermally communicating with said raw material through said inner guiding duct; and a guiding wall extending between said outer and inner guiding ducts at said pre-cooling portion of said heat exchange channel in a spiral manner, wherein said freezing portion of said heat exchange channel has a cylindrical shape for maximizing an expansion area of said refrigerant between said feeding channel and said heat exchange channel, while said pre-cooling portion of said heat exchange channel has a helix shape for prolonging a traveling time at said pre-cooling portion so as to ensure said refrigerant being completely evaporated;

wherein said guiding wall has a trapezoidal cross section that a width of said guiding wall is gradually reducing from said outer guiding duct to said inner guiding duct.

2. A direct expansion evaporator for making frozen product from raw material, comprising:

a feeding channel having a feeding end and a dispensing end for said raw material feeding through said feeding channel;

a heat exchange channel thermally communicating with said feeding channel, wherein said heat exchange channel has a pre-cooling portion defining from said feeding end of said feeding channel and a freezing portion to said dispensing end to thermally communicate with said feeding channel in a two-stage evaporation manner; wherein said heat exchange channel is guided for refrigerant passing therethrough in order to heat exchange with said raw material within said feeding channel, wherein when said refrigerant flows at said pre-cooling portion of said heat exchange channel, said raw material fed from said feeding end of said feeding channel is initially pre-cooled at a pre-cooling temperature, and when said refrigerant flows at said freezing portion of said heat exchange channel, said raw material is then substantially frozen to form said frozen product before said frozen product is dispensed at said dispensing end of said feeding channel while being energy efficient;

an outer guiding duct and an inner guiding duct coaxially enclosed within said outer guiding duct to define said feeding channel within said inner guiding duct and said heat exchange channel between said outer and inner guiding ducts in an air-sealed manner, wherein when said raw material is fed along said inner guiding duct, said refrigerant is thermally communicating with said raw material through said inner guiding duct; and a guiding wall extending between said outer and inner guiding ducts at said pre-cooling portion of said heat exchange channel in a spiral manner, wherein said freezing portion of said heat exchange channel has a cylindrical shape for maximizing an expansion area of said refrigerant between said feeding channel and said heat exchange channel, while said pre-cooling portion of said heat exchange channel has a helix shape for prolonging a traveling time at said pre-cooling portion so as to ensure said refrigerant being completely evaporated;

wherein said heat exchange channel has an inlet and an outlet for guiding a flow of said refrigerant that when said refrigerant flows from said inlet of said heat exchange channel to said outlet thereof, said refrigerant is completely evaporated from liquid phase to gaseous phase for completely converting thermal energy to form said frozen material;

wherein said inlet and outlet of said heat exchange channel are located adjacent to said dispensing end and said feeding end of said feeding channel respectively, such that a feeding direction of said raw material is opposite to a flowing direction of said refrigerant;

wherein said flowing direction of said refrigerant at said freezing portion of said heat exchange channel is parallel to said feeding direction of said raw material at said feeding channel, while said flowing direction of said refrigerant at said pre-cooling portion of said heat exchange channel is tangent to said feeding direction of said raw material at said feeding channel;

wherein said guiding wall has a trapezoidal cross section that a width of said guiding wall is gradually reducing from said outer guiding duct to said inner guiding duct.

3. A direct expansion evaporator for making frozen product from raw material, comprising:

a feeding channel having a feeding end and a dispensing end for said raw material feeding through said feeding channel;

a heat exchange channel thermally communicating with said feeding channel, wherein said heat exchange channel has a pre-cooling portion defining from said feeding end of said feeding channel and a freezing portion to said dispensing end to thermally communicate with said feeding channel in a two-stage evaporation manner; wherein said heat exchange channel is guided for refrigerant passing therethrough in order to heat exchange with said raw material within said feeding channel, wherein when said refrigerant flows at said pre-cooling portion of said heat exchange channel, said raw material fed from said feeding end of said feeding channel is initially pre-cooled at a pre-cooling temperature, and when said refrigerant flows at said freezing portion of said heat exchange channel, said raw material is then substantially frozen to form said frozen product before said frozen product is dispensed at said dispensing end of said feeding channel while being energy efficient;

an outer guiding duct and an inner guiding duct coaxially enclosed within said outer guiding duct to define said feeding channel within said inner guiding duct and said heat exchange channel between said outer and inner guiding ducts in an air-sealed manner, wherein when said raw material is fed along said inner guiding duct, said refrigerant is thermally communicating with said raw material through said inner guiding duct; and a guiding wall extending between said outer and inner guiding ducts at said pre-cooling portion of said heat exchange channel in a spiral manner, wherein said freezing portion of said heat exchange channel has a cylindrical shape for maximizing an expansion area of said refrigerant between said feeding channel and said heat exchange channel, while said pre-cooling portion of said heat exchange channel has a helix shape for prolonging a traveling time at said pre-cooling portion so as to ensure said refrigerant being completely evaporated;

wherein said heat exchange channel has an inlet and an outlet for guiding a flow of said refrigerant that when said refrigerant flows from said inlet of said heat exchange channel to said outlet thereof, said refrigerant is completely evaporated from liquid phase to gaseous phase for completely converting thermal energy to form said frozen material;

wherein said inlet and outlet of said heat exchange channel are located adjacent to said dispensing end and said feeding end of said feeding channel respectively, such that a feeding direction of said raw material is opposite to a flowing direction of said refrigerant;

wherein said flowing direction of said refrigerant at said freezing portion of said heat exchange channel is parallel to said feeding direction of said raw material at said feeding channel, while said flowing direction of said refrigerant at said pre-cooling portion of said heat exchange channel is tangent to said feeding direction of said raw material at said feeding channel;

wherein said refrigerant is in liquid phase under a predetermined high pressure before entering into said heat exchanging channel and is in gaseous phase exiting said heat exchanging channel so as to prevent liquid back flow of said refrigerant along said heat exchange channel and to enhance cooling capacity of said refrigerant;

wherein said feeding channel is coaxially aligned with said heat exchange channel;

wherein said guiding wall has a trapezoidal cross section that a width of said guiding wall is gradually reducing from said outer guiding duct to said inner guiding duct.

4. The direct expansion evaporator, as recited in claim 3, wherein said helix shape of said pre-cooling portion of said heat exchange channel has a uniform pitch along a helix axis.

5. The direct expansion evaporator, as recited in claim 4, wherein said inlet of said heat exchange channel is radially formed at an end of said outer guiding channel at a position close to said dispensing end of said feeding channel, while said outlet of said heat exchange channel is radially formed at an opposed end of said outer guiding channel at a position close to said feeding end of said feeding channel.

6. The direct expansion evaporator, as recited in claim 5, further comprising an insulating material encircling with said heat exchange channel for preventing heat exchange with an ambient when said refrigerant passes through said heat exchange channel.

7. The direct expansion evaporator, as recited in claim 6, wherein said insulating material is polyurethane foam encircling with said outer guiding duct to ensure said refrigerant being heat changed with said raw material through said inner guiding duct.

* * * * *